Feb. 9, 1965    R. A. WILLYARD ETAL    3,168,980
SELECTOR
Filed July 31, 1961    5 Sheets-Sheet 4
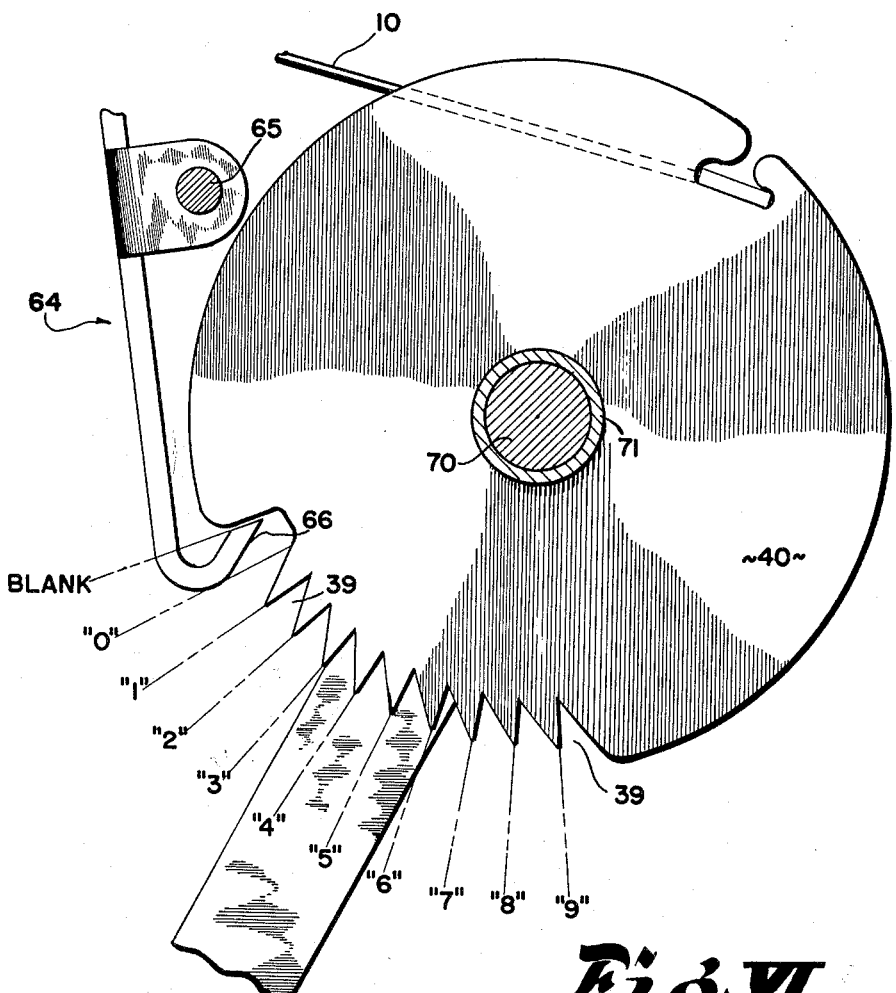
Fig. VII
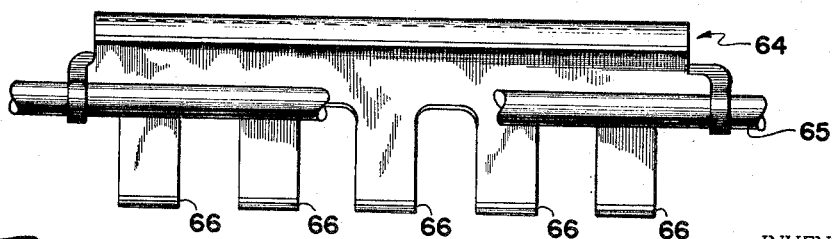
Fig. IX
INVENTORS.
ROGER A. WILLYARD
BY CLARENCE E. ADLER
Marshall + Wilson
ATT'YS.

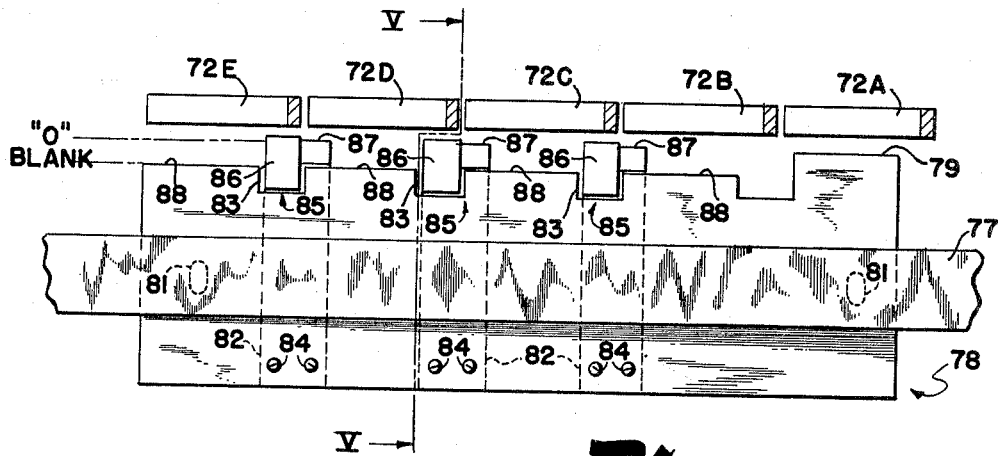
Fig. IV
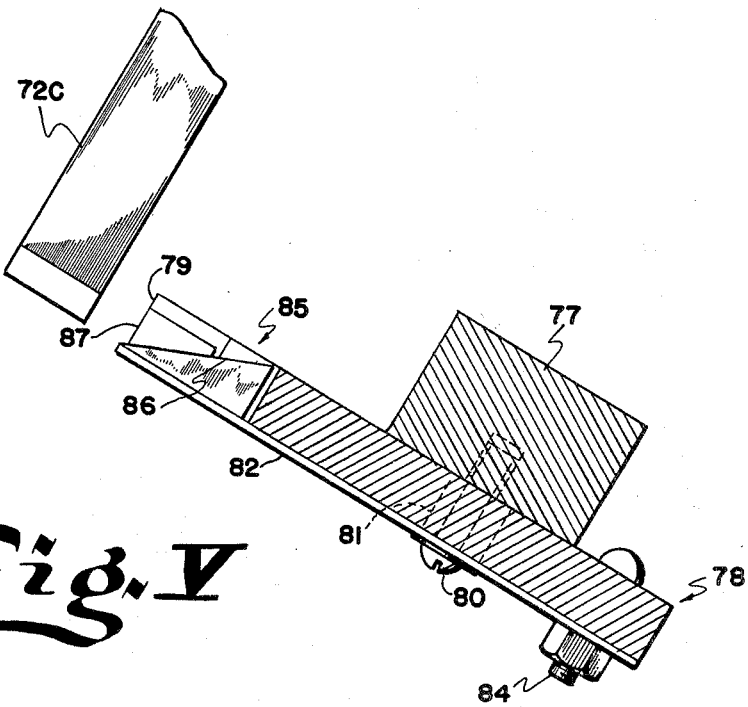
Fig. V

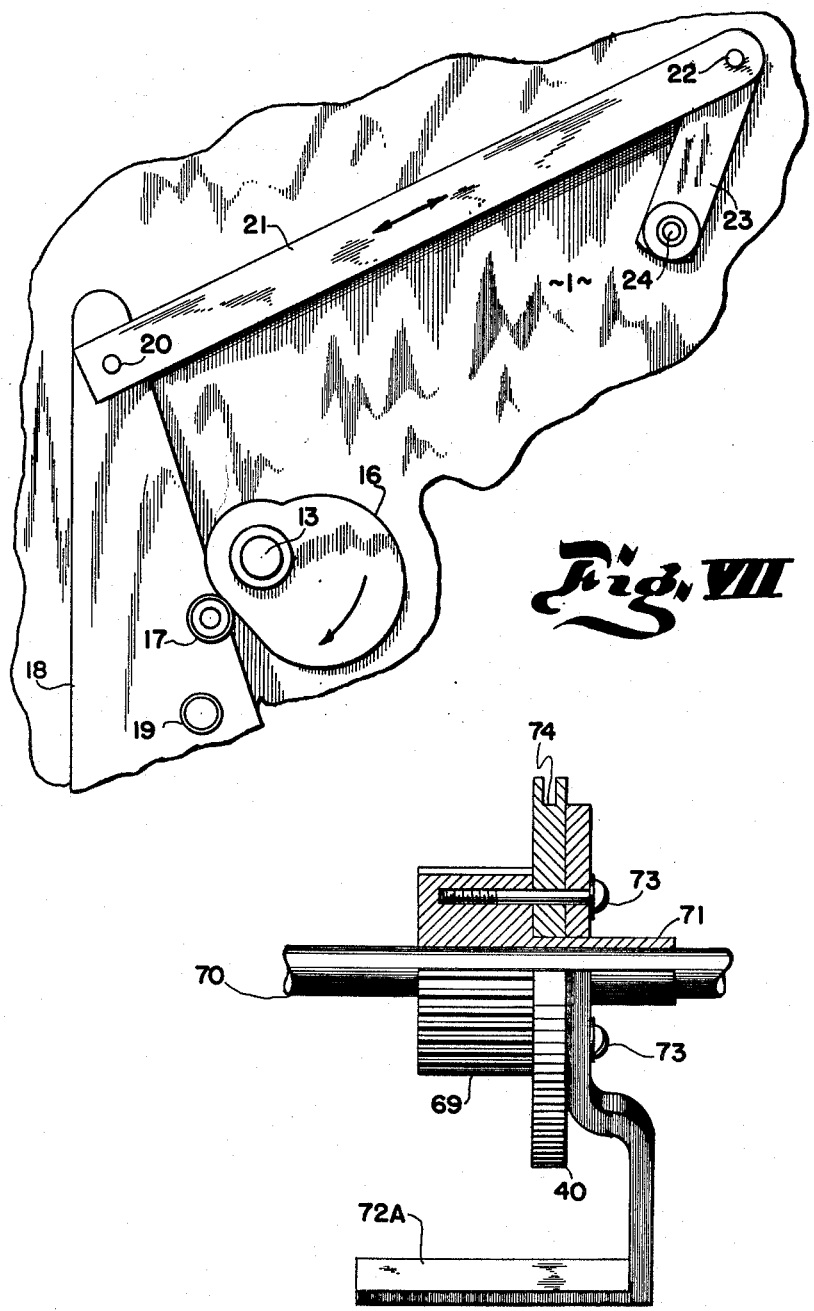

United States Patent Office 3,168,980
Patented Feb. 9, 1965

3,168,980
SELECTOR
Roger A. Willyard and Clarence E. Adler, Toledo, Ohio, assignors to Toledo Scale Corporation, Toledo, Ohio, a corporation of Ohio
Filed July 31, 1961, Ser. No. 128,184
16 Claims. (Cl. 235—1)

This invention relates to mechanical sensing mechanisms.

The invention is especially useful for sensing step cams which are positioned in accordance with measured values and for setting up recorders according to such measured values.

Heretofore, mechanical sensing mechanisms, if moved out of engagement with sensed elements, "forgot" the readings. Accordingly, such elements could not be repositioned in accordance with the next measured values until the recorders were finished recording. This made for slow operations especially where repeat recording was required. Also, the prior mechanical sensing mechanisms were not fool-proof, accurate, compact, of low cost and set up redundant zeros in the recorders and were not readily adaptable to set up both mechanical recorders, such as printers, and electrical recorders, such as electric typewriters.

Accordingly, the objects of this invention are to improve mechanical sensing mechanisms, to increase the operating speeds, the accuracy, the reliability, and the compactness of such mechanisms, to eliminate the setting up of redundant zeros in recorders by such mechanisms, to readily set up mechanical recorders, such as printers, and/or electrical recorders, such as electric typewriters, by such mechanisms, and provide a "memory" for such mechanisms, whereby such mechanisms may be disengaged from the sensed elements before recording is completed so that the sensed elements may be repositioned while the recorder is recording to increase the overall speed of operation.

One embodiment of this invention enabling the realization of these objects is a mechanical sensing mechanism adapted to sense the step cams, disclosed in U.S. application Serial No. 123,683 filed July 13, 1961, now Patent No. 3,128,041, in the name of C. E. Adler, which are set up in accordance with the count in a mechanical counter. The sensing mechanism includes a plurality of sensing fingers which are driven into engagement with the step cams and withdrawn by means which sets up a recorder in accordance with the reading and having a portion which is locked in place after the recorder is set up and continues to be locked after the sensing fingers are withdrawn. Means are provided which cooperate with the sensing mechanism for suppressing redundant zeros.

In accordance with the above, one feature of this invention resides in locking the above portion of the sensing mechanism after the recorder is set up and continuing to lock such portion in place after the sensing fingers are withdrawn from the step cams. This provides a "memory" for the sensing mechanism whereby the sensing fingers may be disengaged from the step cams before recording is completed so that the step cams can be repositioned while the recorder is recording to increase the overall speed of operation. This feature also facilitates repeat recording.

Another feature resides in the superior simplicity of the sensing mechanism which nevertheless is fool-proof, accurate, compact and of low cost.

Still another feature resides in the ready adaptability of the sensing mechanism to set up mechanical recorders, such as printers or electrical recorders, such as electric typewriters.

A further feature resides in suppressing redundant zeros. That is, all zero steps on the step cams are sensed, but should any zeros be redundant they are not set up in the recorder.

The above and other objects and features of this invention will be appreciated more fully from the following detailed description when read with reference to the accompanying drawings wherein:

FIG. I is a fragmentary plan view of mechanical sensing mechanism according to this invention;

FIG. II is a fragmentary perspective view illustrating the basic operation of the sensing mechanism;

FIG. III is an enlarged, vertical sectional view taken along the line III—III of FIG. I;

FIG. IV is a plan view of a portion of the sensing mechanism as seen from a position on line IV—IV of FIG. III;

FIG. V is a sectional view taken along the line V—V of FIG. IV;

FIG. VI is an enlarged view of part of the mechanism as shown in FIG. III;

FIG. VII is an enlarged, fragmentary elevational view as seen from a position along the line VII—VII of FIG. I;

FIG. VIII is partly a vertical sectional view and partly an elevational view taken along the line VIII—VIII of FIG. III; and FIG. IX is an elevational view of a pawl assembly a part of which is shown in perspective mounted in the sensing mechanism as shown in FIG. II.

Referring to the drawings, a mechanical sensing mechanism as contemplated in this invention includes a pair of spaced end plates 1 each having an integrally formed horizontal ear 2 and a pair of integrally formed vertical ears 3. Three angle brackets 4 extend between the end plates 1 and are attached to the vertical ears 3. A cover plate 5 is attached to the upper one of the angle brackets 4; the cover plate 5 is shown in FIG. III, but not in FIG. I for clarity of illustration.

The sensing mechanism of the invention functions to sense step cams which are rotated with mechanical counter number wheels 6 (FIG. III) in accordance with measured values and to set up a recorder according to such measured values. The number wheels 6 are shown only as a broken circular line in FIG. III, but are shown and described in detail in the above U.S. application Serial No. 123,683 which discloses a mechanical counter having five number wheels with a maximum count indication of 99,999. Integrally formed with each of the number wheels is a step cam having steps corresponding to the ascending integral numbers borne by the number wheel. For the purpose of understanding the invention, it is only necessary to understand that a step cam is provided for each order and the step cams are positioned in accordance with the count accumulated in the counter and that the steps on such cams are sensed by the sensing mechanism in order to set up a recorder to record such count. Each of the step cams has a series of steps which begin at "0" level (FIG. III) and ascend in integral steps to the "9" level (FIG. III). When a counter number wheel 6 displays zero, the "0" level on its step cam is positioned to be sensed by the sensing mechanism, when a counter number wheel 6 displays one, the "1" level on its step cam is positioned to be sensed by the sensing mechanism etc.

The steps on the step cams are sensed by sensing fingers 7, there being a sensing finger provided for ecah of the step cams. Before the sensing fingers 7 engage the step cams, a detent finger 8 engages a ten-pointed star wheel 9 to center the number wheels 6 and thereby the step cams to the nearest unit value before sensing and subsequent recording takes place. The star wheel 9 is shown and described in detail in the above U.S. application Serial No. 123,683. Such recording may be accomplished by, for example, a printer or an electric typewriter. The sensing mechanism is described hereinafter as setting up the printer disclosed in U.S. Patent No. 2,922,361 issued Jan. 26, 1960 in the names of C. E. Adler et al. Such printer includes a printing sector for each order in the numbers to be printed. Each sector is rotated into printing position by means of a cable in opposition to a return spring. Corresponding cables are shown as cables 10 in FIGS. I, III and VI and corresponding return springs are shown as return spring 11 in FIG. III. There is one cable 10 and one return spring 11 for each decade.

The sensing fingers 7 and the detent finger 8 are driven by a motor that is not shown but which turns a gear 12 (FIG. I) through one revolution for each cycle. Any suitable means for turning the gear 12 through one revolution per cycle and consequently a shaft 13, carrying the gear, journaled in bearings 14 carried by the end plates 1 through one revolution per cycle can be utilized. A hub 15, carried on an end of the shaft 13, carries in turn a cam 16 which is turned through one revolution per cycle in the direction indicated by the curved arrow in FIG. VII. The cam 16 cooperates with a cam following roller 17 on an arm 18 pivotally mounted on a stub shaft 19 attached to the end plate 1. The upper end of the arm 18 is pivotally attached by means of a pin 20 to an end of a link 21 which is reciprocated back and forth as indicated by the double ended arrow in FIG. VII every time that the cam 16 is turned through one revolution. The other end of the link 21 is pivotally attached by means of a pin 22 to an end of a rock arm 23 secured to an end of a shaft 24 journaled in the end plates 1. Reciprocation of the link 21 rotates the shaft 24 back and forth about its axis.

The shaft 24 carries two cams 25 each having a hub 26 pinned at 27 to the shaft 24. As shown in FIG. I, the cams 25 are spaced nearly the distance between the end plates 1. As shown in FIG. III, each of the cams 25 includes an open mouth 28, an inner cam surface 29, and an outer cam surface 30. That one of the cams 25 shown in FIG. III also carries a pin 31. Movement of the shaft 24 back and forth about its axis during a complete cycle first moves the cams 25 as viewed in FIG. III counterclockwise about the axis of the shaft 24, i.e., toward the sensing fingers 7, and then clockwise about the axis of the shaft 24, i.e., away from the sensing fingers 7.

The sensing fingers 7 and the detent finger 8 are guided between rods 32 extending between the end plates 1 and in notches 33 in a horizontal plate 34 secured to and extending between the horizontal ears 2 of the end plates 1. Upward movements of the sensing fingers 7 are limited by the step cams on the counter number wheels 6; upward movement of the detent finger 8 is limited by the star wheel 9. Downward movements of the sensing fingers 7 are limited by a stop rod 35 extending between the end plates 1. A bracket 36 is mounted on each of the fingers 7 and 8 and each bracket has an end out of its plane to provide a space receiving a pin 37. The brackets 36 on the sensing fingers 7 are attached to the fingers by means of screws 38 which extend through oversize slots in the fingers 7 to provide an adjustment correlating the sensed steps on the cams with notches 39 in settable cable drums 40 hereinafter described.

A rack 41 is provided for each of the sensing fingers 7. The racks 41 are slidably mounted in bearings 42 carried by the lower two of the three angle brackets 4 and each has an open-ended slot in its upper end receiving a bell crank 43 which is pivotally mounted in such slot by means of a pin 44. The right hand arms of the bell cranks 433 as viewed in FIG. III are slotted for the receptions of the pins 37 carried by the sensing fingers 7 pivotally attaching the bell cranks to the sensing fingers and the left hand arms of the bell cranks 43 are secured to return springs 45 attached to a rod 46 extending between the end plates 1. The pin 37 carried by the detent finger 8 is received in the slotted end of an arm 47 pivotally mounted by means of a stub shaft 48 carried by the end plate 1 to pivotally connect the detent finger to the end of the arm 47. Intermediate the pivotal connection of the arm 47 to the stub shaft 48 and the pivotal connection of the arm 47 to the detent finger 8, a drive spring 49 is connected to the arm 47. The other end of the spring 49 is attached to a pin 50 extending from the end plate 1.

A stationary shaft 51 is supported by the end plates 1 and functions to pivotally mount a pair of spaced arms 52, one of which is shown in FIG. I and the other of which is shown in FIG. III, and a reset bell crank 53. The arms 52 carry between them a shaft 54 which carries in turn two rollers 55 (FIG. I) driven by the cams 25 and five rollers 56 for driving the five bell cranks 43. The roller 55 cannot be seen in FIG. III because it is directly behind the roller 56; however, both of the rollers 55 can be seen in FIG. I. Two return springs 57 (one shown in FIG. III) extending between a rod 58 carried by the end plates 1 and the shaft 54 urge the shaft 54 and the arms 52 which carry the shaft 54 counterclockwise about the axis of the stationary shaft 51. Such counterclockwise movement is limited by engagement of the upper ends of the arms 52 with the cam hubs 26. The reset bell crank 53 pivotally mounts an arm 59 on a pivot 60 and has a tab 61 bent over the end of the arm 59. Such end of the arm 59 is urged into contact with the tab 61 by means of a spring 62 coiled around the pivot 60 and having one end bearing on the tab 61 and one end engaging such end of the arm 59. The other end of the arm 59 carries a roller 63 which as shown in FIG. I is located underneath one of the cams 25 in position to be engaged thereby.

The lower end of the bell crank 53 engages a pawl assembly 64 pivotally mounted on a stationary shaft 65 extending between the end plates 1. The pawl assembly 64 includes five pawl fingers 66 (FIG. IX) and is urged in a counterclockwise direction as viewed in FIG. III about the axis of the shaft 65 by means of a spring 67 extending between the pawl assembly 64 and a rod 68 extending between the end plates 1. The pawl fingers 66 cooperate with some of the notches 39 in the cable drums 40 to lock the drums in place as hereinafter described.

The racks 41 mesh with pinions 69 mounted for rotation on a stationary shaft 70 extending between the end plates 1. Each of the pinions 69 includes an integrally formed hub 71 (FIG. VIII) carrying the cable drum 40 and a redundant zero suppression arm, there being five redundant zero suppression arms, a units arm 72A, a tens arm 72B, a hundreds arm 72C, a thousands arm 72D and a ten thousands arm 72E, and the pinion 69, drum 40 and arm being attached together by means of screws 73 so that the pinion, drum and arm are rotatable as one about the axis of the stationary shaft 70. The cable drum 40 is provided with ten of the notches 39 (FIG. VI) hereinafter described in detail. Each of the cable drums 40 carries one of the cables 10 in a peripheral groove 74 (FIG. VIII), an end of the cable 10 being secured to the cable drum 40 as shown in FIG. VI. The cables 10 run through cable casings 74 which are supported in slots 75 (FIG. I) in the rod 68. Adjustment nuts 76, threaded on the cable casings 74, provide for positioning the cable casings in the slots 75 to adjust the positions of the printing sectors in the printer set up by the cables 10 in the same way as the positions of the printing sectors are adjusted in the printer disclosed in U.S. application Serial No. 840,886 filed Sept. 18, 1959 in the name of C. E. Adler. In operation, a print is made and an inspection is made of the alignment of the numbers. This alignment is adjusted by trial and error adjustment of the adjustment nuts 76 to adjust the printing positions of the printing sectors until the numbers are printed in a straight, even row.

At the beginning of a cycle, the cams 25 and the sensing and detent fingers 7 and 8 are positioned as shown in FIG. III. However, the bell cranks 43 may be all in different positions about the axes of the pins 44 atop the racks 41 and the racks 41 may be all in different vertical positions depending on the last reading made of the step cams. The cams 25 first move counterclockwise about the axis of the shaft 24. This immediately moves the pin 31 carried by that one of the cams 25 shown in FIG. III out of engagement with the free end of the arm 47 permitting the drive spring 49 to pivot the arm 47 counterclockwise about the axis of the shaft 48 driving the detent finger 8 into engagement with the star wheel 9. This centers the counter number wheels 6 to the nearest unit value before the step cams are sensed by the sensing fingers 7. Next, the outer cam surface 30 of that one of the cams 25 shown in FIG. III engages the roller 63 carried by the arm 59 driving the bell crank 53 counterclockwise about the axis of the stationary shaft 51. The lower or vertical arm of the bell crank 53 drives the pawl assembly 64 clockwise about the axis of the stationary shaft 65 withdrawing the pawl fingers 66 from the notches 39 in the cable drums 40 in opposition to the return spring 67 unlocking the cable drums.

As soon as the cable drums 40 are unlocked, the return springs 11 in the printer and the return springs 45 attached to the bell cranks 43 drive the racks 41 upwardly and the bell cranks 43 clockwise about the axes of the pins 44 atop the racks into reset positions which are shown in FIG. III. This returns all of the printing sectors in the printer to blank except the units sector which returns to zero. When the racks 41 move upwardly they all move to the same height and the bell cranks 43 all are pivoted into the same positions about the axes of the pins 44, but the bottoms of the sensing fingers 7 all remain against the stop 35 as shown in FIG. III.

The above resetting takes place while the roller 63 runs along the outer cam surface 30 keeping the cable drums 40 unlocked. As soon as the resetting is accomplished and while the roller 63 continues to run along the outer cam surface 30 keeping the cable drums 30 unlocked, the inner cam surfaces 29 engage the rollers 55 driving the rollers 55, the shaft 54 carrying the rollers 55 and the arms 52 carrying the shaft 54 clockwise about the axis of the stationary shaft 51. This moves the five rollers 56 also carried by the shaft 54 each against its respective bell crank 43 pivoting the bell cranks 43 counterclockwise about the axes of the pins 44 atop the racks 41.

Counterclockwise rotation of the bell cranks 43 about the axes of the pins 44 atop the racks 41 drives the sensing fingers 7, operatively connected to the bell cranks, upwardly into contact with the step cams. Each of the sensing fingers 7 moves upwardly at least from "START" position to the "9" step cam level shown in FIG. III and is stopped at any one of the ten step cam levels depending on the orientation of the step cam. There are steps for the numbers one through nine and zero but no blank on each cam. Clockwise movement of the rollers 56 about the axis of the stationary shaft 51 continues. Since the sensing fingers 7 are stopped by engagement with the step cams, the racks 41 are driven downwardly by the continued driving action of the rollers 56 against the bell cranks 43. If a sensing finger 7 has moved only a relatively small distance, e.g., from "START" to "9," its respective rack moves downwardly a relatively large distance, etc. All of the lower arms of the bell cranks 43 are driven until they assume vertical positions as viewed in FIG. III. At this time the rollers 55 are received in the open mouths 28 of the cams 25 and the driving force applied to the cams 25 ceases. Downward movements of the racks 41, since they mesh with the pinions 69 and since the pinions move as one with the cable drums 40, winds the cables 10 onto the cable drums setting up the printer in opposition to the printer return springs 11. At this time, each of the printing sectors has been moved a little beyond its final position.

Immediately after the printer has been set up a little beyond its final position, the roller 63 runs off the outer cam surface 30 removing the driving force on the bell crank 53 permitting the return spring 67 to pivot the pawl assembly 64 counterclockwise about the axis of the stationary shaft 65 moving the pawl fingers 66 into the notches 39 in the cable drums 40. The printer return springs 11 then drive the cable drums 40 clockwise about the axis of the stationary shaft 70 until the pawl fingers 66 engage the sides of the notches 39 or until stopped by stops in redundant zero suppression mechanism hereinafter described to finally position the printing sectors. This drives the racks 41 upwardly very small distances and locks the cable drums 40 and consequently the racks 41 and the printing sectors ready for printing.

After the racks 41 are locked, the cams 25 start back to their home positions shown in FIG. III. The roller 63 again runs along the outer cam surface 30, but nothing happens because in this direction the left hand end, as viewed in FIG. III, of the arm 59 moves away from the bell crank tab 61 in opposition to the spring 62. Consequently, the pawl assembly 64 remains in its locked position. At the same time, the return springs 57 move the arms 52 until they engage the cam hubs 26 as shown in FIG. III and the return springs 45 pivot the bell cranks 43 clockwise about the axes of the pins 44 atop the racks 41 until the sensing fingers 7 are withdrawn from the step cams and assume their positions against the stop 35 as shown in FIG. III. When that one of the cams 25 carrying the pin 31 reaches its home position, the pin 31 engages the free end of the arm 47 withdrawing the detent finger 8 from the star wheel 9 in opposition to the drive spring 49.

One of the features of the sensing mechanism resides in locking the cable drums 40 after the printer is set up and continuing to lock the cable drums 40 in place after the sensing fingers 7 are withdrawn from the step cams. This provides a "memory" for the sensing mechanism whereby the sensing fingers can be disengaged from the step cams before printing is completed so that the step cams can be repositioned while the printer is printing to increase the overall speed of operation. This feature also facilitates repeat printing.

Another feature resides in the ready adaptability of the sensing mechanism to set up either mechanical recorders, such as the above printer, or electrical recorders, such as electric typewriters. An electric typewriter is set up by including the printer return springs 11 in the sensing mechanism itself and adding an arm carrying a brush to each of the cable drums 40. The brushes cooperate with commutator contacts in circuit with the typewriter. For example, if a "9" is read by a sensing finger 7, the respective brush is so positioned that the nine wire to the typewriter is energized energizing in turn a solenoid operating the proper "9" typewriter key.

Another feature resides in suppressing redundant zeros. There are steps for the numbers one through nine and zero but no blank on each step cam. Accordingly, zeros always are sensed but sometimes such zeros are redundant. The redundant zero suppression arms 72A, 72B, 72C, 72D, and 72E each rotates as one with its respective pinion 69 and cable drum 40 and cooperates with mechanism responsive to the sensing of redundant zeros shown in detail in FIGS. IV and V. A stationary bar 77 (FIGS. III, IV and V) extends between the end plates 1. Attached to the bar 77 is a block 78 having an extended front surface 79 for stopping the units redundant zero suppression arm 72A. The block 78 is attached to the bar 77 by means of screws 80 which extend through oversize slots 81 in the block 78 providing an adjustment hereinafter described and carries three flexure springs 82 aligned with notches 83 in the block 78 as shown in FIG. IV. The flexure springs 82 are fulcrumed on bolts 84. The free ends of the flexure springs 82 each carries a block 85 having a ramp 86 and a front surface 87 aligned with the front surface 79 on the block 78. The ramps 86 are received in the notches 83 in the block 78.

Each of the cable drums 40 is provided with ten notches 39. The first nine notches 39 counting from the right in FIG. VI have pawl finger stopping surfaces indicated by the broken lines identified by the numbers "1" through "9." The tenth notch 39 has no pawl finger stopping surface but has two places in which the pawl finger 66 is located when a blank or a zero is set up in the printer, such places being identified by "BLANK" and "0" in FIG. VI.

As above described, immediately after the pawl fingers 66 are removed from the notches 39, the printer return springs 11 and the return springs 45 attached to the bell cranks 43 drive the racks 41 upwardly and the bell cranks 43 clockwise about the axes of the pins 44 atop the racks into reset positions which are shown in FIG. III. This returns all of the printing sectors in the printer to blank except the units sector which returns to zero and pivots the redundant zero suppression arms counterclockwise about the axis of the stationary shaft 70. Units arm 72A engages the front surface 79 on the block 78 at that time as shown in FIG. III. The zero positions of all the arms 72A–72E are shown by the broken line identified by "0" in FIG. IV. The rest of the arms, i.e., arms 72B–72E engage front surfaces 88 on the block 78 at that time. The blank positions of arms 72B–72E are shown by the broken line identified by "BLANK" in FIG. IV. The units arm 72A has no blank position, it always returns to zero. It is possible for the arms 72B–72E all to reach their blank positions because as the arms 72B–72E rotate counterclockwise as viewed in FIG. III, arms 72C–72E engage their respective ramps 86 bending the flexure springs 82 and moving the front surfaces 87 of the blocks 85 out of the way. The front surfaces 87 define the zero positions of the arms 72B–72D. The ten thousands arm 72E has no zero position, it always returns to blank. In other words, with reference to FIG. IV, the arm 72E engages its ramp 86 pushing its block 85 down until the arm 72E is stopped by the respective front surface 88 on the block 78 locating the arm 72E in blank position. When arm 72E pushes its block 85 down, the front surface 87 of such block 85 is moved out of the path of arm 72D. Accordingly, arm 72D is free to move to its blank position in contact with the respective front surface 88 on the block 78. In moving to its blank position, arm 72D engages its ramp 86 pushing its block 85 down and moving the front surface 87 of such block 85 out of the path of arm 72C. Accordingly, arm 72C is free to move to its blank position in contact with the respective front surface 88 on the block 78. In moving to its blank position, arm 72C engages its ramp 86 pushing its block 85 down and moving the front surface 87 of such block 85 out of the path of arm 72B. Accordingly, arm 72B is free to move to its blank position in contact with the respective front surface 88 on the block 78. Hence, in the reset position, the arm 72A is in its zero position and the rest of the arms 72B–72E are in their blank positions.

As above described, downward movement of the racks 41 sets up the printer in opposition to the printer return springs 11, the printing sectors being moved a little beyond their final positions. This moves arms 72B–72E at least from their blank positions to their zero positions. With reference to FIG. VI, when the numbers 1–9 are sensed, the cable drum 40 is rotated clockwise about the axis of the stationary shaft 70 to position the proper notch 39 opposite the now unlocked pawl finger 66 with the pawl finger stopping surface of such notch so positioned slightly clockwise from the pawl finger 66 that when the pawl finger 66 moves into the notch it is free of such stopping surface. At this time, i.e., when numbers 1–9 are sensed, the redundant zero suppression arms have no function. After the pawl finger 66 moves into the proper notch 39, the printer return spring 11 drives the cable drum 40 counterclockwise until the pawl finger 66 engages the stopping surface of the notch 39 to finally position and lock the printing sector in one of its 1–9 positions. The above description of the operation of one of the cable drums 40 applies to all of the cable drums. Hence, the printing sectors are finally positioned and locked each in one of its 1–9 positions in accordance with the reading made by the sensing fingers 7.

Should a zero be sensed in the units order, the units pawl finger 66 moves into the first notch 39 from the left as viewed in FIG. VI. The units return spring 11 holds the units zero suppression arm 72A against the front surface 79 of the block 78 and the pawl finger 66 does not contact the units cable drum 40, such finger being located at "0" in FIG. VI. In fact, none of the pawl fingers 66 ever locks up in zero or blank. Accordingly, whenever a zero is sensed in the units order, a zero is printed in the units order, zeros never being redundant in the units order.

Should a zero be sensed in the ten thousand order, the redundant zero suppression arm 72E moves from its blank to zero position and the ten thousands pawl finger 66 moves into the first notch 39 from the left as viewed in FIG. VI. After the pawl finger 66 moves into such notch 39, as above described, the ten thousands printer return spring 11 drives its cable drum 40 counterclockwise until the redundant zero suppression arm 72E engages the front surface 88 of the block 78, i.e., its blank position, the pawl finger 66 being located at "BLANK" in FIG. VI. In moving to its blank position, the arm 72E engages its ramp 86 depressing its block 85 and, thus, moving the front surface 87 on such block out of the path of the thousands redundant zero suppression arm 72D. Should a 1–9 be sensed in the ten thousands order, as hereinbefore described, the arm 72E has no function and, accordingly, in such case the front surface 87 on the block 85 is not moved out of the path of the thousands redundant zero suppression arm 72D. Accordingly, whenever a zero is sensed in the ten thousands order, a blank is set up in the printer in the ten thousands order, all zeros being redundant in the ten thousands order, and whenever a zero is sensed in the ten thousands order, the front surface 87 on the block 85 at the redundant zero suppression arm 72E is moved out of the path of the redundant zero suppression arm 72D, but whenever 1–9 is sensed in the ten thousands order, the front surface 87 on the block 85 at the redundant zero suppression arm 72E remains in the path of the redundant zero suppression arm 72D.

Should a zero be sensed in the thousands order, the redundant zero suppression arm 72D moves from its blank to zero position and the thousands pawl finger 66 moves into the first notch 39 from the left as viewed in FIG. VI. After the pawl finger 66 moves into such notch 39, the thousands printer return spring 11 drives its cable drum 40 counterclockwise until the redundant zero suppression arm 72D engages either the front surface 87 of the block 85 at the arm 72E or the front surface 88 of the block 78, the pawl finger 66 being located at "0" in FIG. VI when the arm 72D engages the front surface 87 or being located at "BLANK" in FIG. VI when the arm 72D engages the front surface 88. The redundant zero suppression arm 72D engages the front surface 87 of the block 85 at the arm 72E to set up a zero in the thousands order in the printer whenever 1–9 is sensed in the ten thousands order and consequently such front surface 87 has not been moved out of the path of the arm 72D, i.e., a zero is printed in the thousands order because such zero is not redundant as evidenced by the fact that 1–9 has been sensed in the ten thousands order. The redundant zero suppression arm 72D engages the front surface 88 of the block 78 to set up a blank in the thousands order in the printer whenever zero is sensed in the ten thousands order and consequently such front surface 87 has been moved out of the path of the arm 72D, i.e., a blank is set up in the thousands order in the printer because the zero which has been sensed in the thousands order is redundant as evidenced by the fact that zero has been sensed in the ten thousand order. Accordingly, whenever a zero is sensed in the thousands order, either a blank or a zero is set up in the printer depending upon whether or not the sensed zero is redundant. In moving to its zero position or its 1–9 positions the arm 72D does not operate the middle one of the blocks 85 as viewed in FIG. IV; however, in moving to its blank position the arm 72D engages the ramp 86 on such block 85 depressing the block and, thus, moving the front surface 87 on such block out of the path of the hundreds redundant zero suppression arm 72C.

In a manner similar to the above, the hundreds redundant zero suppression arm 72C moves to its zero position when a zero is sensed in the hundreds order and then remains in the zero position if the sensed zero is not redundant or returns to its blank position if the sensed zero is redundant, the arm 72C remaining in the zero position or returning to the blank position depending on whether or not the arm 72D has driven the middle one of the blocks 85 as viewed in FIG. IV out of the path of the arm 72C. In returning to its blank position, the arm 72C engages the ramp 86 of the right hand block 85 as viewed in FIG. IV depressing the block and, thus, moving the front surface 87 on such block out of the path of the tens redundant zero suppression arm 72B.

In a manner similar to the above, the tens redundant zero suppression arm 72B moves to its zero position when a zero is sensed in the tens order and then remains in the zero position if the sensed zero is not redundant or returns to its blank position if the sensed zero is redundant, the arm 72B remaining in the zero position or returning to the blank position depending on whether or not the arm 72C has driven the right hand one of the blocks 85 as viewed in FIG. IV out of the path of the arm 72B.

To summarize the suppression of redundant zeros, during the overall operation, the arms 72B–72E move at least from their blank positions to their zero positions. When numbers 1–9 are sensed, all of the arms 72A–72E move to their respective 1–9 positions and are locked up by the pawl fingers 66. When zeros are sensed, arm 72A which has no blank position remains in its zero position setting up a zero in the units order in the printer, arm 72E moves from its blank position to its zero position and returns to its blank position setting up a blank in the ten thousands order in the printer, and arms 72B–72D move from their blank positions to their zero positions and stay in such zero positions if blocked by the front surfaces 87 of the blocks 85 setting up zeros in the tens, hundreds and thousands orders in the printer or return to their blank positions if not blocked by such front surfaces 87 setting up blanks in the tens, hundreds and thousands order in the printer.

For example, should the number "00005" be sensed by the sensing fingers 7, the arms 72B–72E each returns to its blank position because the arm 72E depresses its block 85, the arm 72D depresses its block 85, etc., while the arm 72A is locked up in its five position setting up "5" in the printer, the redundant zeros being suppressed. However, should the number "10005" be sensed by the sensing fingers 7, the arm 72E is locked up in its one position, the arms 72B–72D are locked up in their zero positions by engagement with the front surfaces 87 of the blocks 85, while the arm 72A is locked up in its five position setting up "10005" in the printer, none of the zeros being redundant. The adjustment provided by the screws 80 extending through the oversize slots 81 in the block 78 is used to position the zero and blank stops on the block 78 and on the blocks 85 carried by the block 78 relative to the numbers 1–9 stops provided by the notches 39 in the cable drums 40 so that the pawl fingers 66 will be located during lock up in the position shown in FIG. VI.

The sensing mechanism can be simplified by eliminating the redundant zero suppression mechanism in which case a zero notch is provided on each of the cable drums 40 so that the pawl fingers 66 lock up the cable drums 40 when numbers 1–9 and 0 are sensed. In this arrangement, the racks 41 are members the positions of which indicate the step cam reading.

It is to be understood that the above description is illustrative of this invention and that various modifications thereof can be utilized without departing from its spirit and scope.

Having described the invention, we claim:

1. Sensing mechanism for reading step cams positionable according to measured values, in combination, fingers for sensing steps on the cams according to the positions of the cams, drive means for driving the fingers into and out of engagement with the cams including bell cranks mounted to be pivotable and movable in rectilinear paths, the positions of the bell cranks in such paths indicating the reading, and means for locking the bell cranks in such paths, the bell cranks driving the fingers out of engagement with the cams after the bell cranks are locked in such paths, whereby the cams can be repositioned while the bell cranks are locked in such paths.

2. Sensing mechanism for reading step cams positionable according to measured values, in combination, fingers for sensing steps on the cams according to the positions of the cams, drive means for driving the fingers into and out of engagement with the cams including members the positions of which indicate the reading and bell cranks pivotally mounted one on each of the members and pivotally connected to the fingers, and means for locking the members in such positions, the bell cranks being pivoted after the members are locked in such positions to drive the fingers out of engagement with the cams, whereby the cams can be repositioned while the members are locked in such positions.

3. Sensing mechanism for reading step cams positionable according to measured values, in combination, fingers for sensing steps on the cams according to the positions of the cams, rectilinearly movable members the positions of which indicate the reading, bell cranks pivotally mounted one on each of the members and pivotally connected to the fingers, lock means for locking the members in such positions, and means operable after the members are unlocked for pivoting the bell cranks in a direction to drive the fingers into engagement with the cams and the members into such positions and operable after the members are locked for pivoting the bell cranks in the opposite direction to withdraw the fingers from engagement with the cams, whereby the cams can be repositioned while the members are locked in such positions.

4. Sensing mechanism for reading step cams positionable according to measured values, in combination, fingers for sensing steps on the cams according to the positions of the cams, rectilinearly movable members one for each of the fingers, bell cranks pivotally mounted one on each of the members and pivotally connected to the fingers, recorder setting-up means operatively connected to the members, drive means for pivoting the bell cranks in a direction to drive the fingers into engagement with the cams, operation of the drive means causing the bell cranks to first drive the fingers into engagement with the cams and then drive the members distances in accordance with the steps sensed by the fingers, such driving of the members operating the recorder setting-up means, and means for pivoting the bell cranks in the opposite direction to withdraw the fingers from engagement with the cams while the members are stationary.

5. Sensing mechanism for reading step cams positionable according to measured values, in combination, fingers for sensing steps on the cams according to the positions of the cams, bell cranks mounted to be pivotable and movable in rectilinear paths operatively connected to the fingers, recorder setting-up means operatively connected to the bell cranks, drive means for pivoting the bell cranks in a direction to drive the fingers into engagement with the cams and for moving the bell cranks in their rectilinear paths distances in accordance with the steps sensed by the fingers, such movements of the bell cranks in their rectilinear paths operating the recorder setting-up means, and means for pivoting the bell cranks in the opposite direction to withdraw the fingers from engagement with the cams while the bell cranks are stationary in their rectilinear paths.

6. Sensing mechanism for reading step cams positionable according to measured values, in combination, sensing means for engaging steps on the cams to sense such steps according to the positions of the cams, recorder setting-up means operatively connected to the sensing means, lock means having a home position wherein it locks the recorder setting-up means, drive means movable from a home position for operating the sensing means and the recorder setting-up means in a direction to make and set up a reading, the drive means prior to so operating the sensing means and the recorder setting-up means moving the lock means out of its home position unlocking the recorder setting-up means and after so operating the sensing means and the recorder setting-up means permitting the lock means to return to its home position relocking the recorder setting-up means, the drive means returning to its home position after the recorder setting-up means is relocked, and means for operating the sensing means in the opposite direction to disengage the sensing means from the cams while the recorder setting-up means is locked.

7. Sensing mechanism for reading cams having steps ascending from zero positionable according to measured values, in combination, sensing means for sensing the steps on the cams according to the positions of the cams, mechanism operatively connected to the sensing means for setting up a recorder according to the reading, and redundant zero suppression means responsive to the sensing of redundant zeros for preventing the mechanism setting up redundant zeros in the recorder.

8. Sensing mechanism for reading cams having steps ascending from zero positionable according to measured values, in combination, sensing means for sensing the steps on the cams according to the positions of the cams, resilient means, mechanism operatively connected to the sensing means positionable in a first direction in a path according to the reading and to blank for setting up a recorder in opposition to the resilient means, a latch for latching the mechanism in some of its positions, the resilient means urging the mechanism in a direction opposite to the first direction toward its blank position, and redundant zero suppression means located in the path for stopping the mechanism in the rest of its positions when not latched by the latch, whereby the recording of redundant zeros is suppressed.

9. Sensing mechanism for reading cams having steps ascending from zero through nine positionable according to measured values, in combination, sensing means for sensing the steps on the cams according to the positions of the cams, resilient means, mechanism, including a rotatable notched member for each order in the reading rotated by the sensing means in a first direction in a path according to the reading, for setting up a recorder in opposition to the resilient means, the member being additionally rotatable to a blank position and having nine peripheral notches for one through nine positions and one peripheral notch for zero and blank positions, pawl fingers cooperable with the notched members for latching the members in their one through nine positions, the pawl fingers being received in the notches for the zero and blank positions without engaging the notched members, the resilient means urging the notched members in a direction opposite to the first direction toward the blank position, and redundant zero suppression means responsive to the sensing of redundant zeros located in the path for stopping the notched members in their zero and blank positions, the notched members being stopped in the blank positions when zeros are redundant.

10. Sensing mechanism for reading step cams positionable according to measured values, in combination, sensing means for sensing steps on the cams according to the positions of the cams, resilient means, mechanism operatively connected to the sensing means for setting up a recorder according to the reading in opposition to the resilient means, the recorder being settable according to the reading and to blank, and stop means responsive to the sensing of redundant zeros for stopping the mechanism when driven by the resilient means in positions setting up blanks in the recorder.

11. Sensing mechanism for reading step cams positionable according to measured values, in combination, sensing means for sensing steps on the cams according to the positions of the cams, settable means set by the sensing means according to the reading, and means responsive to the sensing of redundant zeros for setting the settable means to blank.

12. Sensing mechanism for reading stem cams positionable according to measured values, in combination, sensing means for sensing steps on the cams according to the positions of the cams, resilient means, settable means having positions corresponding to the steps on the cams and blank positions, the settable means being set in opposition to the resilient means by the sensing means according to the reading, the resilient means urging the settable means toward zero and blank positions, redundant zero suppression means responsive to the sensing of redundant zeros for stopping the settable means in the zero and blank positions eliminating redundant zeros by stopping the settable means in blank positions, and means for latching the settable means in positions other than said zero and blank positions.

13. Sensing mechanism for reading step cams positionable according to measured values, in combination, sensing means for sensing steps on the cams according to the positions of the cams, resilient means, settable means having positions corresponding to the steps on the cams, the settable means being set in opposition to the resilient means by the sensing means according to the reading, and means for latching the settable means in said positions.

14. Sensing mechanism for reading step cams positionable according to measured values, in combination, sensing means for sensing steps on the cams according to the positions of the cams, resilient means, settable means having positions corresponding to the steps on the cams and blank positions, the settable means being set in opposition to the resilient means by the sensing means according to the reading and by the resilient means to blank positions, and means responsive to the sensing of redundant zeros for preventing movement of the settable means to blank positions except when sensed zeros are redundant.

15. Sensing mechanism for reading step cams positionable according to measured values, in combination, fingers for sensing steps on the cams according to the positions of the cams, drive means for driving the fingers into and out of engagement with the cams including lever means mounted to be pivotable and movable in rectilinear paths, the positions of the lever means in such paths indicating the reading, and means for locking the lever means in such paths, the lever means driving the fingers out of egagement with the cams after the lever means are locked in such paths, whereby the cams can be repositioned while the lever means are locked in such paths.

16. Sensing mechanism for reading step cams positionable according to measured values, in combination, fingers for sensing steps on the cams according to the positions of the cams, drive means for driving the fingers into and out of engagement with the cams including members the positions of which indicate the reading and lever means pivotally mounted one on each of the members and pivotally connected to the fingers, and means for locking the members in such positions, the lever means being pivoted after the members are locked in such positions to drive the fingers out of engagement with the cams, whereby the cams can be repositioned while the members are locked in such positions.

References Cited in the file of this patent

UNITED STATES PATENTS

| | | |
|---|---|---|
| 1,880,314 | Cook | Oct. 4, 1932 |
| 2,792,275 | Drillick | May 14, 1957 |
| 2,948,465 | Allen | Aug. 9, 1960 |